United States Patent [19]

Odone et al.

[11] 4,304,487

[45] Dec. 8, 1981

[54] RANGE FINDER FOR STILL OR MOVING PICTURE CAMERAS

[75] Inventors: Giovanni Odone, St. Sulpice; Willy Buchs, Lonay; Frieder Heizmann, Monnaz, all of Switzerland

[73] Assignee: Robert Bosch GmbH, Stuttgart, Fed. Rep. of Germany

[21] Appl. No.: 98,603

[22] Filed: Nov. 29, 1979

[30] Foreign Application Priority Data

Dec. 14, 1978 [DE] Fed. Rep. of Germany ....... 2853978

[51] Int. Cl.$^3$ ............................ G01C 3/00; G01C 5/00; G03B 7/08
[52] U.S. Cl. ............................................ 356/1; 354/25
[58] Field of Search ........................... 356/1, 4; 354/25

[56] References Cited

U.S. PATENT DOCUMENTS 3,224,319 12/1965 Robert et al. ............................ 356/1
3,442,193 5/1969 Pagel ...................................... 356/4
3,558,894 1/1971 Odone et al. ........................... 356/4
3,936,187 2/1976 Momose .................................. 356/4

*Primary Examiner*—S. C. Buczinski
*Attorney, Agent, or Firm*—Marianne Rich

[57] ABSTRACT

To measure the distance to a selected object, the range finder transmits infrared light in a beam having a straight limiting edge on one side. The object reflects light back from the illuminated region and a lens receives part of the light and creates an image of the illuminated region including the straight limiting edge on a plane inclined at an angle to the optical axis of the lens. A detector, including a photoelectric transducer part of which is masked by a mask having a straight edge, is moved along the plane until the edge of the mask and the edge of the image are aligned as closely as possible. The position of the detector when this alignment takes place is indicative of the distance of the object from the range finder.

11 Claims, 4 Drawing Figures

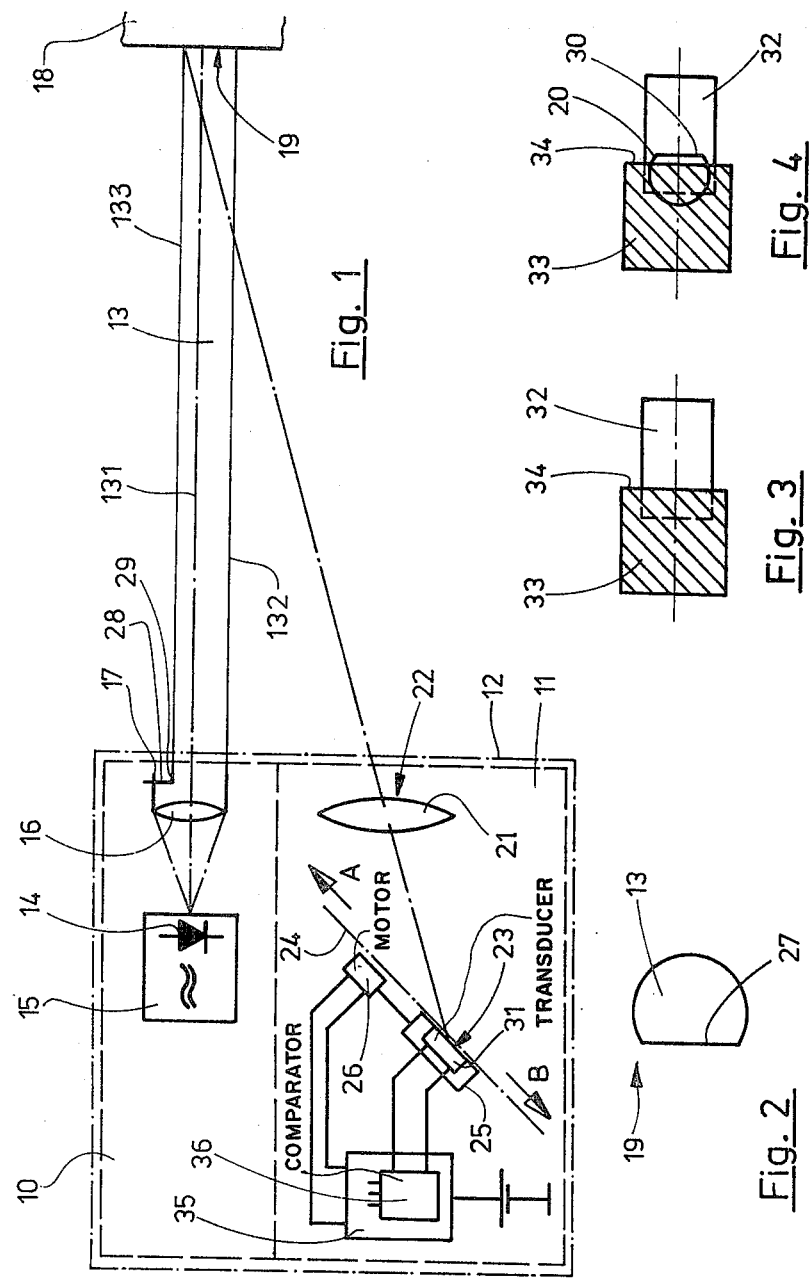

RANGE FINDER FOR STILL OR MOVING PICTURE CAMERAS

CROSS-REFERENCE TO RELATED APPLICATIONS AND PUBLICATIONS

1. Swiss Patent "Telemetre notamment pour l'emploi en photographie No. 449 985" of Dec. 15, 1966.
2. The article "An automatic rangefinder and focus control systems" in the Journal of the SMPTE (January 1969).
3. U.S. patent application Ser. No. 686,554 filed Nov. 29, 1967.

The present invention relates to range finders and, in particular, to range finders suitable for use in photographic or moving picture cameras.

BACKGROUND AND PRIOR ART

In known range finders a bundled light beam is transmitted to the object to which the distance is to be measured. The object diffusely reflects back the light and the reflected light is received by at least one optical element which creates at least one image of the illuminated region of the object, the position of the image relative to the optical element being indicative of the distance of the object from the receiving apparatus. The position of the image is then detected by a detector movable with respect to the optical element.

In known range finders of this type, the optical element is a mirror having a spherical surface which is reflective in a peripheral region only. The detector comprises two photoelectric transducers, preferably photo diodes, which have a relatively large light receiving surface. Two planar mirrors and a third planar, thin separating mirror are so arranged that two separate images of the illuminated region of the object are created on the third mirror, the optical axis of the images being parallel to the optical axis of the equipment. The two photoelectric transducers are arranged along the optical axis in front of and behind the third mirror, respectively. To measure the distance to the object, the detector is moved along the optical axis until both images appear sharply on the third mirror. In this position of the detector, half of the light reflected by the first and second planar mirrors onto the third mirror passes through the latter and impinges upon the first photoelectric transducer, while the other half is reflected and impinges upon the second photoelectric transducer. When the light received by the two photoelectric transducers is equal, a stop signal for the detector is generated and the movement of the detector is stopped. As mentioned above, the position of the images created in the receiving equipment, that is the position of the third mirror or its relative movement, constitute a measure for the distance of the object from the receiving equipment.

This system has a number of disadvantages. First, two photoelectric transducers each with a relatively large light receiving surface are required. Such photoelectric transducers are relatively expensive and are further relatively slow acting, since the response time increases with the size of the photoelectric layer. This slow response type makes the known receiving equipment unsuitable for use with a transmitter which generates infrared light in the form of pulses by means of a laser diode. Generally, the pulse duration of individual pulses in such a pulse sequence is approximately 100 n sec. For this, a relatively quick response time in the receiving equipment is required, so that the inertia of the two photoelectric transducers constitutes a substantial handicap. Also, the optical element which is in the form of a spherical mirror must be relatively large since the distance from the mirrored peripheral region determines the sensitivity of the receiver. Therefore the known equipment requires not only relatively expensive optical elements, but also results in a relatively large size for the range finder.

THE INVENTION

It is an object of the present invention to furnish a range finder which is simple to construct, economical, and relatively small.

Since the range finder of the present invention is to be suitable for both motion picture and still cameras, it is a further object of the present invention to furnish a range finder whose accuracy is particularly good for close objects and decreases only when the object is at distances at which the focusing, that is the sharpness of the resulting picture, will not be affected. It is thus an object of the present invention to furnish a range finder whose accuracy is such that sharp pictures will result even if the object is extremely close to the camera.

It is a further object of the present invention to furnish a range finder which is insensitive to differences in brightness of the object within the illuminated region.

In accordance with the present invention, means are provided which transmit a light beam having a planar limiting edge on one side thereof to the selected object, thereby creating an illuminated region on said object. At least part of the light diffusely reflected by the object is received by optical means such as an objective which creates an image of the illuminated region including the planar edge, the position of the image relative to the optical means being indicative of the distance to the selected object. Detector means, such as a photo diode, is provided which is movable relative to the optical means and furnishes a stop signal when in a final position indicative of the position of the planar edge relative to the optical means. Finally, moving means, such as a servomotor, is provided for moving the detector means relative to the optical means until receipt of the stop signal, so that the final position of the detector means relative to the optical means constitutes a measure of the distance to the selected object.

In a particularly preferred embodiment, the detector comprises a photoelectric transducer having a photoelectric layer, and a mask covering a part of the photoelectric layer, the mask having a masking edge extending across the layer in a direction parallel to the straight limiting edge of the image of the illuminated region.

DRAWING DESCRIBING A PREFERRED EMBODIMENT

FIG. 1 is a schematic side view of a range finder according to the present invention;

FIG. 2 is a top view of the region of the object illuminated by the light beam transmitted by the range finder of the present invention;

FIG. 3 is a top view of a photoelectric layer and mask of the range finder of the present invention; and FIG. 4 is the same top view as shown in FIG. 3, but including the image of the illuminated region of the object created by the receiving equipment.

The range finder shown in FIG. 1 includes transmitting apparatus, 10 and receiving apparatus, 11 which are mounted in a common housing, 12. The transmitting apparatus radiates a bundled light beam 13 which, preferably, is infrared light. Light beam 13 is schematically represented in FIG. 1 by a central line 131 and two outer limiting lines 132 and 133. Light beam 13 comprises a sequence of individual light pulses generated by a laser diode 14, which is part of a light pulse generator 15. The light generated by laser diode 14 is bundled by an objective 16 and radiated as a sharply limited light beam 13 through a light transmissive opening 17 of transmitter 10. The light beam impinges on an object 18 the distance to which is to be determined by the range finder. The illuminating region 19 on object 18 is shown on FIG. 2. Depending upon the type of surface object 18 has, light will be reflected therefrom more or less diffusely, but illuminated region 19 will become visible. Receiving apparatus 11 receives at least part of the diffusely reflected light and creates an image 20 (FIG. 4) of the illuminated region of object 18, the position of the image in receiving apparatus 11 constituting a measure of the distance of the object therefrom. Receiving apparatus 11 includes a convergent lens 21 constituting an optical element 22 and a detector 23 which is movable relative to the optical element. Lens 21 is mounted at a predetermined distance to opening 17 in the housing of transmitting apparatus 10 and has an optical axis which is parallel to the axis of the light beam. If the maximum range covered by the range finder is approximately 20 meters, the distance between the axes of lens 21 and objective 16 is approximately 40 mm. Lens 21 creates a relatively sharp image 20 of the illuminated region 19 of object 18 on a planar surface 24 which is inclined relative to the principal axis of convergent lens 21. Plane 24 is indicated by a dash dot line in FIG. 1. The inclination of plane 24 is so chosen that relatively sharp images will be created in plane 24 for the different distances of object 18 from lens 21. The images 20 move from the position shown in FIG. 1 in the direction of arrow A for increasing distances of object 18 to lens 21, and, for decreasing distances, move in the direction of arrow B.

Detector 23 is mounted to be movable along plane 24. For this purpose, detector 23 is mounted on a carrier 25 which is driven by an electromotor 26, preferably a servomotor, whose direction of rotation can be reversed.

As shown in FIG. 2, light beam 13 has, on the one side thereof, a straight limiting line 27. To create this straight line, a light blocking flap 28, preferably in the form of a segment of a circle is arranged on one side of opening 17, the flap having a straight limiting edge 29 on the side facing the axis 131 of the light beam. As will be described in greater detail below, the position of detector 23 is adjusted relative to image 20, and, more particularly, to image 30 of limiting line 27. The position of detector 23 after adjustment relative to image 30 of limiting line 27 is a measure of the distance of object 18 from the range finder. The distance of object 18 from the range finder can therefore be read from a correspondingly calibrated scale mounted on housing 12 of the range finder, after the above-mentioned adjustment of position of detector 23.

Preferably, detector 23 is a single photoelectric transducer 31, preferably a photo diode. The photoelectric layer 32 of transducer 31 is partially covered by a mask 33 (FIG. 3). This mask has a straight edge extending across photoelectric layer 32 in a direction parallel to image 30 of limiting line 27 (FIG. 4).

The output of transducer 31 is connected to a control circuit 35 also mounted within receiver 11. Control circuit 35 includes a comparator 36 (shown schematically in FIG. 1) which compares the output signal from transducer 31 to a predetermined threshold value. When the output signal of transducer 31 is equal to the threshold value (voltage) a stop signal is generated at the output of comparator 36 which causes detector 23 to stop moving. Preferably comparator 36 is the type of comparator wherein a first or second control signal is generated when the output of transducer 31 is, respectively, larger or smaller than the threshold voltage and wherein the stop signal is, as mentioned above, generated when the two values are equal. The first and second control signal cause movement of the detector 23 in a first direction, or in a second direction opposite to the first direction, respectively. The output of control circuit 35 is connected to electromotor 26 which rotates in a first or second direction depending upon the control signal applied thereto and which stops when the stop signal is applied thereto.

OPERATION

The range finder is aimed at the object 18 the distance to which is to be measured and is switched in. The transmitting apparatus 10 transmits the bundled light beam 13 which impinges upon object 18 and creates thereon a sharply limited illuminated region as shown in FIG. 2. The light reflected back from the object is received by the receiving apparatus and causes an image of the illuminated region 19 to be created on plane 24 at a position corresponding to the distance of the object from the range finder. Detector 23 or, more specifically, transducer 31 is now moved by electromotor 26 along plane 24. Specifically, let it be assumed that transducer 31 first receives no light. It therefore generates no output signal and, it will be assumed, under these conditions, detector 23 is driven in the direction of arrow A, that is in the direction indicative of greater distances to the object. Since it is desired that the position of edge 34 relative to edge 30 be utilized to determine the final position of detector 23, it is necessary that mask 33 precede the photoelectric transducer 32 in the direction of increasing distance, i.e. arrow A should point from right to left for the arrangement shown on FIG. 4. As soon as transducer 31 receives light pulses, it generates voltage pulses corresponding thereto at its output. As long as the amplitude of the voltage pulses are smaller than the threshold value set at comparator 36, the control signal at the output of the comparator will cause electromotor 26 to continue rotating in the same direction of rotation, so that transducer 31 continues to move in the direction of arrow A. If the drive should overshoot, that is if the signals at the output of transducer 31 were to become greater than the threshold value, a reversal of the direction of rotation of electromotor 26 would take place under control of the output signal from comparator 36, so that transducer 31 would now move in the direction of arrow B, that is in the direction of shorter distances to the object. When the transducer furnishes an output signal which has an amplitude equal to the threshold value set at the input of comparator 36, the stop signal is furnished by comparator 36 which causes motor 26 to be stopped. Detector 23, that is transducer 31, is now positioned in the correct position indicative of the distance of the object from the range finder. This final position of detector 23, that is the amount that detector 23 has been moved from a first predetermined position, constitutes a measure of the distance of the object from the range finder.

If it is assumed that the range finder has been pointed to a relatively faraway object and is then pointed to a closer object, it is then necessary that detector 23 will be moved in the direction of arrow B, that is too much light must fall on the photosensitive surface. For this purpose, the photosensitive surface must be sufficiently long that, even if it is in the extreme position indicative of maximum distance to the object, sufficient light will still fall on it from the image of an object at the closest possible range to cause the output signal from comparator 36 to be the second control signal which, in turn, causes motor 26 to drive detector 23 in the direction indicated by arrow B. This movement will then continue until the output signal of transducer 31 is equal to the threshold value, that is until mask 33 covers enough of the image to decrease the output from the transducer by the required amount.

However a much shorter photo sensitive surface may be employed by use of a plate of glass which is partially metallized on one side and completely metallized on the other side and which works as indicated in FIG. 5.

For both of the above conditions, it will be noted that, in the final position of detector 23, edge 34 of mask 33 does not coincide exactly with the image 30 of line 27. Specifically, enough distance must remain between image 30 of limiting line 27 and masking edge 34 to allow enough light to impinge upon the transducer to create the necessary output signal therefrom. The distance between the limiting edge 34 of mask 33 and image 30 of limiting line 27 of the light beam is very small for short distances between object 8 and the range finder and increases with increasing distances. Thus, if the equipment is calibrated for coincidence between the two lines, the measuring error increases with increasing distances to the object and is extremely small for very short distances between object 18 and the range finder. An example will be given:

Range finder data is assumed to be the following:

Diameter of light beam 13 = 15 mm,
Distance between lines 21 and objective 16 = 40 mm,
Focal length of lens 21 = 60 mm,
Maximum range of range finder = 20 m.

For an object distance of two meters, the diameter of image 20 of the illuminated region 19 of object 18 will be 0.46 mm. The intensity of illumination of image 20 on plane 24 for an object distance of 2 m is 100 times that for an object distance of 20 m. This is because intensity of illumination decreases in proportion to the square of the distance. The amplitude of the output signal of transducer 31 depends upon the amount of light falling on the transducer. Movement of transducer 31 is always interrupted when the output voltage of transducer 31 is equal to the threshold voltage applied to comparator 36. In order to reach this threshold value, the amount of light falling on photosensitive layer 32 of transducer 31 must reach a particular value. Since, for an object distance of 2 meters the intensity of illumination on photo layer 32 of transducer 31 is 100 times as large as that for a distance of 20 meters, the threshold value at the output of transducer 31 is reached when mask 34 covers 99% of image 20, so that only 1% of the image surface is sensed by photo layer 32. When the mask has reached this position, as shown schematically in FIG. 4 for a short object distance, comparator 36 furnishes the stop signal which stops electromotor 26. The distance between edge 34 of mask 33 from the image 30 of limiting edge 27 of light beam 13 then is 4.6 micrometers for a light beam diameter of 15 mm. The measuring error therefore is approximately 8 mm, that is about 0.4%.

At an object distance of 10 meters, the diameter of image 20 of the illuminated region 19 of object 18 becomes 0.09 mm. The intensity of illumination of image 20 is four times that for an object at a distance of 20 meters. Therefore mask 33 with transducer 31 must be moved so that 75% of image 20 is covered and only 25% of image 20 causes illumination to fall on layer 32. The distance between image 30 of limiting line 27 and the edge 34 of mask 33 will be 0.025 mm in this case. The absolute measuring error can then be computed to be 1.042 mm, the percent error being 10.4%.

These two examples demonstrate that a range finder according to the present invention measures very exactly for small object distances and causes a measuring error of only a few percent at longer distances. The error will be still greater when the maximum range is reached. The relatively larger error at the longer distances is generally acceptable for range finders to be used in photographic and moving picture cameras for which the range must be very exact for focusing purposes for short object distances but need not be so exact at longer distances. In instruments where a higher accuracy at longer distances is required, the relatively larger error at such distances could be decreased either by taking into consideration the distance between the image 30 of limiting line 27 and edge 34 of mask 33 when calibrating the instrument at the longer distances or by automatically changing the threshold value applied to the comparator at such distances. The latter implementation could be achieved by coupling a potentiometer arm mechanically to the detector so that movement of the detector causes corresponding movement in the potentiometer arm, the latter being used to tap off the threshold voltage for the comparator from a fixed voltage source.

The same effect may be achieved by slightly decreasing the device sensivity at short distances. This may be obtained also by a second auxiliary photodetector placed in such a way that it collects only a few percent of the infrared radiation collected by the receiver. The output of the auxiliary photodetector controls the comparator threshold or, for instance, may be amplified in a differential manner with the transducer 31 output. Obviously at longer distances, the effect of the second photodetector will be of no account, as we wish.

Various changes and modifications may be made within the scope of the inventive concepts.

We claim:

1. Apparatus for measuring the distance between a receiving location and a selected object, comprising, means (14–17) for transmitting a light beam having a straight limiting edge (27) on one side thereof to said selected object, thereby creating an illuminating region on said object, said object diffusely reflecting light back from said illuminated region toward said transmitting location;

at said receiving location;

optical means (22) positioned to receive at least part of said reflected light for creating an image of said illuminated region including said straight limiting edge, the position of said image relative to said optical means being indicative of said distance to said selected object;

detector means (23) movable relative to said optical means for furnishing a stop signal when in a final position indicative of the position of said straight limiting edge relative to said optical means; and means (26) for moving said detector means relative to said optical means until receipt of said stop signal, whereby said final position of said detector means relative to said optical means constitutes a measure of said distance between said receiving location and said selected object.

2. Apparatus for measuring the distance between a receiving location and a selected object, comprising, means (14–17) for transmitting a light beam having a straight limiting edge (27) on one side thereof to said selected object, thereby creating an illuminating region on said object, said object diffusely reflecting light back from said illuminated region toward said transmitting location;

at said receiving location;

optical means (22) positioned to receive at least part of said reflected light for creating an image of said illuminated region including said straight limiting edge, the position of said image relative to said optical means being indicative of said distance to said selected object;

detector means (23) movable relative to said optical means for furnishing a stop signal when in a final position indicative of the position of said straight limiting edge relative to said optical means, said detector means comprising a photoelectric transducer having a photoelectric layer, and a mask (33) covering a part of said photoelectric layer, said mask having a masking edge extending across said photoelectric layer in a direction parallel to said straight limiting edge of said image of said illuminated region; and means (26) for moving said detector means relative to said optical means until receipt of said stop signal, whereby said final position of said detector means relative to said optical means constitutes a measure of said distance between said receiving location and said selected object.

3. Apparatus as set forth in claim 2, wherein said photoelectric transducer furnishes a photoelectric output signal indicative of the quantity of light falling on said photoelectric layer; and wherein said detector means further comprises comparator means (36) for comparing said output signal to a threshold signal and for furnishing said stop signal when said photoelectric output signal has a predetermined relationship to said threshold signal.

4. Apparatus as set forth in claim 3, wherein said moving means move said detector means in a first direction or a second direction opposite to said first direction in response to a first or second control signal applied thereto, respectively; and wherein said comparator means further comprises means for furnishing said first or second control signal when said photoelectric output signal is greater than or less than said threshold signal, respectively.

5. Apparatus as set forth in claim 4, wherein said moving means comprises an electric motor turning in a first or second direction in response to said first or second control signal, respectively, and carrier means (25) driven by said electric motor and carrying said photoelectric transducer.

6. Apparatus as set forth in claim 5, wherein said optical means has a principal axis;

further comprising a plane inclined relative to said principal axis for receiving said image of said illuminated region; and wherein said carrier means move said photoelectric transducer in said first or second direction along said plane in response to said first or second control signal, respectively.

7. Apparatus as set forth in claim 1, wherein said transmitting means comprises light generating means (14), light blocking means positioned in operative vicinity to said light generating means and having an opening (17) permitting passage of said light from said light generating means, said opening forming said light beam, said light beam having an axis (131); and a flap fastened to said light blocking means and extending into said opening, said flap having a straight edge on the side facing said axis of said light beam.

8. Apparatus as set forth in claim 7, wherein said light generating means comprises means for generating a sequence of infrared light pulses.

9. Apparatus as set forth in claim 8, wherein said transmitting means comprises a light pulse generator, a laser diode, and an objective lens.

10. Apparatus as set forth in claim 8, wherein said transmitting means comprises a light pulse generator, a light emitting diode, and an objective lens.

11. Apparatus as set forth in claim 1, further comprising a housing for housing said transmitting means, said optical element, said detector means and said moving means.

* * * * *